United States Patent [19]

Kieger

[11] Patent Number: 4,643,766

[45] Date of Patent: Feb. 17, 1987

[54] PROCESS FOR REFINING PHOSPHORIC PIG IRON

[75] Inventor: Roger Kieger, Metz, France

[73] Assignees: 501 Societe Lorraine de Laminage & Continu -Sollac-; 502 Unimetal, both of France

[21] Appl. No.: 840,746

[22] Filed: Mar. 18, 1986

[30] Foreign Application Priority Data

Mar. 20, 1985 [FR] France ................ 85 04138

[51] Int. Cl.$^4$ ................................ C21C 7/00
[52] U.S. Cl. ........................ 75/51.4; 75/51.1; 75/51.2
[58] Field of Search ............... 75/51.1, 51.2, 51.4

[56] References Cited

U.S. PATENT DOCUMENTS 3,282,679  11/1966  Richter ................ 75/51.2
4,439,234   3/1984  Schleimer et al. ........ 75/51.2

*Primary Examiner*—Peter D. Rosenberg
*Attorney, Agent, or Firm*—Bacon & Thomas

[57] ABSTRACT

An improved two phase basic steel refining process for phosphoric pig iron is described which comprises forming a steel having a phosphorus content of not greater than 0.025% by using a substantially stoichiometric amount of lime to neutralize silicon and phosphorus oxides formed during the refining process or contained in the mineral and metallic additions to form dicalcium silicate and tricalcium phosphate, adding all of the basic slag obtained at the end of the previous second phase in the first phase along with at most 25% of the fresh lime required, and blowing at least 80% of the total amount of oxygen required for refining during the first blowing phase followed by a thorough deslagging and entry into the second phase wherein at least 75% of the total quantity of lime is added and the remainder of the oxygen is blown, after blowing of the remaining oxygen, the hot molten slag containing bath is strongly stirred with a stirring gas and the resulting steel having a phosphorus content of not greater than 0.025% is tapped and the remaining slag is available for recycling.

11 Claims, No Drawings

PROCESS FOR REFINING PHOSPHORIC PIG IRON

The present invention relates to a process for refining phosphoric pig iron having a phosphorus content higher than 0.5% and preferably between 0.8% and 2.0% in a refining furnace lined with basic refractory and equipped with low-blowing means only, or with top- and bottom-blowing means, said refining process consisting in the following steps: blowing first most of the oxygen necessary to the refining, in the presence of a slag containing fresh lime and at least part of the recycled slag, deslagging after blowing most of the oxygen, forming a fresh slag with addition of the remaining part of the fresh lime, blowing the remaining oxygen, and after controlling the composition of the steel and making any necessary temperature adjustment, tapping the steel in a ladle and retaining at least part of the second slag for the first blowing phase of the next charging operation.

In a known process of this type, about 90% of the total quantity of oxygen necessary to the refining is blown during the first refining phase, in the presence of slag containing initially between 60 and 70% of the total quantity of lime, then, after deslagging, the rest of oxygen is blown during the second phase, after charging, into the furnace or converter, the remaining quantity of lime, namely 40 to 30% of the total quantity of lime.

After thermal adjustment of the steel by addition of ferrosilicon with possible oxygen overblowing to correct the temperature of the steel, the steel is tapped into the transfer ladle, and also one partial deslagging whereas the remaining part of the slag is reclaimed or recycled for the first refining phase of the next charging operation.

With this known process for producing a steel having at the end of the second refining phase in the converter, a phosphorus content of about 0.025 to 0.030% for a starting pig iron with a phosphorus content of 1.6 to 1.8%, the quantity of lime charged into the furnace is around 90 to 130 kg per ton of steel (kg/tA).

It is therefore necessary to bring to the refining furnace important quantities of CaO in lime form or other mineral materials containing CaO. The fact is known that the charged quantity of lime has a direct bearing on the proportions of the quantities of pig iron and scrap iron charged, on the yield of the refining operation, on the productivity of the furnace and on the wear of the refractory lining of said furnace.

It is the object of the present invention to propose a refining process of the aforesaid type with which important gains can be obtained on the different factors indicated above, hence on the economic balance of the refining operation, while reducing the total quantity of lime charged, for a constant quality of produced steel, namely a steel with a phosphorous content less than or at the most equal to 0.025% and a sulphur content of about 0.025% for a pig iron content of about 0.035%.

This object is reached according to the invention with a process wherein the total quantity of lime used is close or equal to the stoichiometric quantity required for neutralizing the silicon and phosphorus oxides formed during the refining treatment or contained in the mineral and metallic additions and for transforming them in dicalcium silicate $(CaO)_2SiO_2$ and in tricalcium phosphate $(CaO)_3P_2O_5$, at least 80% of the total amount of oxygen required for the refining and all the slag recovered at the end of the preceding charge are used during the first blowing phase with a quantity of fresh lime at most equal to 25% of the total quantity of lime required, and after thorough deslagging at the end of the first refining phase, at least 75% of the total quantity of lime is charged and the rest of the oxygen is blown, and after the end of the oxygen blowing operation, an uninterrupted strong stirring of the hot molten bath and slag is carried out by injecting a stirring gas and finally, the produced steel is tapped into a ladle and all the remaining slag is retrieved and recycled for the next phase.

According to this new steelmaking process, which is also based on an anticipation of the intermediate deslagging time, by opposition to the conventional methods, and on the complete recycling of the slag after the refining operation, the slag, after the first refining phase, is readily deslagged, mass-predephosphoring is conducted during the first phase, by eliminating from the hot molten bath most of the phosphorus, and also the dwelling time of a relatively acid slag in the converter is reduced, this considerably reducing the wear of the refractory lining of the converter.

In addition to that, the fact of charging the largest part of the lime at the beginning of the second refining phase gives at the end of that second phase a very basic slag, this preventing deteriorating of the lining of the converter and permitting a perfect dephosphorizing after the second refining phase, during the strong stirring phase.

Such strong stirring, created by means of a neutral or oxidizing gas, which takes place immediately after the second oxygen-blowing phase, in the presence of the slag of that second phase, ensures an extra dephosphorization by stirring the hot molten bath and the slag.

It must be noted that the refining process requires the use of a converter equipped with high power stirring means. The strong stirring can be obtained with any type of converter equipped with fluid-injection means through the base, and having in particular a stirring gas flow rate at least equal to 0.5 Nm3/min/tA. Obviously, this does not mean that the process according to the invention is limited to bottom-blowing converters. On the contrary, during the two refining phases before the strong stirring phase, part of the oxygen could also be top-blown.

The stirring gas is either a neutral gas such as nitrogen or argon, or an oxidizing gas such as carbon dioxide or other gases with similar effects. The quantity of stirring gas used as advantageously around 1 Nm3/tA and the rates are preferably between 200 Nm3/min. and 700 Nm3/min. depending on the volume of the converter and on the number of tuyeres and their cross-section.

It has been found that with pig iron having a phosphorus content between 0.8 and 1.9%, the quantity of lime required for obtaining a steel with a phosphorus content less than or equal to 0.020%, and produced according to the process of the invention, is between 50 and 65 kg/tA; a substantial gain in iron yield is noted (yield being the weight in kg of raw materials used to obtain 1 ton of product), not counting the various gains in refractory dolomite, in ferrosilicon and in oxygen.

The invention will be more readily understood on reading the following examples of refining process given by way of illustration and non-restrictively:

EXAMPLE 1

In a 240t low-blowing converter, are charged the following materials:
(a) 189 tons of molten iron having the following composition:

| | |
|---|---|
| Si = | 0.488% by weight |
| S = | 0.011% by weight |
| P = | 0.967% by weight |
| C = | 4.2% by weight |

(b) 66.7 tons of scrap iron
(c) 6.9 tons of solid iron
(d) 28 tons of recycled basic slag having the following composition: (in % by weight):
  MnO=2.23%
  $P_2O_5$=8.11%
  S=0.14%
  $SiO_2$=5.45%
  $Al_2O_3$=0.65%
  CaO=44.60%
  MgO=1.08%
  Fe=20%
(e) 20% by weight of the total quantity of lime
(f) 1.5 tons of iron-rich ore (Fe>65%)

The refining process is then conducted as follows:
First bottom-blowing phase:
Blowing of 10510 Nm3 oxygen at the rate of 1000 Nm3/min. for 10.5 mins., this corresponding to 95% of the total quantity of blown-in oxygen.
stoppage for intermediate deslagging
Analysis of the hot molten bath:
  P=0.077% by weight
  S=0.031% by weight
Deslagging of 30 tons of slag
  second refining phase:
Addition of 80% of the total quantity of lime,
Charging of 1.6 tons of ore
Blowing the remaining 5% of oxygen, namely 498 Nm3 at a smaller rate of 600 Nm3/min.
Immediately after the in-flow of oxygen, the converter remaining in vertical position:
Strong stirring of the molten metal bath and slag by injecting 300 Nm3 of nitrogen through the bottom of the converter at a rate of about 500 Nm3/min.
End of the refining process:
Analysis of the steel,
  P=0.011% by weight
  S=0.018% by weight

| | |
|---|---|
| Lime yield gain: | 50 kg/tA (yield = weight in kg of raw materials used to obtain 1 ton of product) |
| Iron yield gain: | 10 kg/tA (yield = weight in kg of raw materials used to obtain 1 ton of product) |

The slag, representing about 28 tons, is recycled, namely entirely re-used for the next charge.

EXAMPLE 2

In a 100 tons twin-blow converter (low- and top-blowing), are charged the following materials:
(a) 81.8 tons of molten pig iron having the following composition:

| | |
|---|---|
| Si = | 0.480% by weight |
| S = | 0.32% by weight |
| C = | 4.25% by weight |
| P = | 1.75% by weight |

(b) 30 tons of scrap iron
(c) 11.80 tons of recycled basic slag having the following composition: (in % by weight):
  MnO=2.0%
  $P_2O_5$=10.2%
  S=0.20%
  $SiO_2$=5.00%
  $Al_2O_3$=0.5%
  CaO=44.0%
  MgO=2.3%
  Fe=25.0%
  Residuary: traces of unidentified elements The refining process consists in:
A first top- and low-blowing phase:
Top- and low-blowing of 4640 Nm3 of oxygen at a rate of 400 Nm3/min. for 11.6 mins., this corresponding to about 85% of the total quantity of oxygen blown-in.
Stoppage for intermediate deslagging
analysis of the hot molten bath
  P=0.075% by weight
  S=0.030% by weight
deslagging of 12.6 tons of slag
  Second refining phase:
addition of 100% of the total quantity of lime
blowing of the remaining 15% of oxygen, namely 808 Nm3 at a rate of 400 Nm3/min.
Immediate strong stirring as in Example 1
end of refining process:
Analysis of the process:
  P=0.018% by weight
  S=0.018% by weight

| | |
|---|---|
| lime yield gain: | 68 kg/tA (yield = weight in kg of raw materials used to obtain 1 ton of product) |
| iron yield gain: | 35 kg/tA (yield = weight in kg of raw materials used to obtain 1 ton of product) |

The basic, slag which represents about 11.8 tons, is recycled, namely entirely re-used for the next charge.

What is claimed is:

1. In a two phase basic steel refining process for phosphoric pig iron using a refining furnace lined with basic refractory and equipped with at least bottom blowing means and wherein in the first phase most of the oxygen used in the refining process is blown in the presence of a slag containing fresh lime and recycled basic slag from a previous cycle and then deslagging the resulting slag before entering the second phase in which a fresh slag is formed with the addition of the remainder of the fresh lime followed by blowing the remainder of the oxygen, controlling the composition of the resulting steel, adjusting the temperature and tapping the steel and retaining at least part of the slag for recycling in the first phase of the process wherein the improvement comprises forming a steel having a phosphorus content of not greater than 0.025% by using a substantially stoichiometric amount of lime to neutralize silicon and phosphorus oxides formed during the refining process or contained in the mineral and metallic additions to form dicalcium silicate and tricalcium phosphate, adding all of the basic slag obtained at the end of the previous second phase in the first phase along with at most 25% of the fresh lime required, and blowing at least 80% of the total amount of oxygen required for refining during the first blowing phase followed by a thorough deslagging and entry into the second phase wherein at least 75% of the total quantity of lime is added and the remainder of the oxygen is blown, after blowing of the remaining oxygen, the hot molten slag containing bath is strongly stirred with a stirring gas and the resulting steel having a phosphorus content of not greater than 0.025% is tapped and the remaining slag is available for recycling.

2. A refining process as claimed in claim 1, wherein the strong stirring is achieved by blowing a gas through the base of the converter.

3. A refining process as claimed in claim 2, wherein a neutral gas is used.

4. A refining process as claimed in claim 2, wherein an oxidizing gas is used.

5. A refining process as claimed in claim 2, wherein the stirring gas is used with a flow rate at least equal to 0.5 Nm3/min./tA.

6. A refining process as claimed in claim 1, wherein oxygen is blown during the first blowing phase in a proportion varying between 80% and 95% of the total quantity of oxygen necessary for the refining.

7. A refining process as claimed in claim 1, wherein the pig iron has a phosphorus content of greater than 0.5%.

8. A refining process as claimed in claim 1, wherein the pig iron has a phosphorus content between 0.8% and 2%.

9. A refining process as claimed in claim 7, wherein the stirring gas is used with a flow rate at least equal to 0.5 $Nm^3$/min./tA.

10. A refining process as claimed in claim 9, wherein the stirring gas is used with a flow rate at least equal to 1 $Nm^3$/tA.

11. A refining process as claimed in claim 9, wherein the stirring gas is used with a flow rate between 200 $Nm^3$/min. and 700 $Nm^3$/min.

* * * * *